United States Patent
Guo et al.

(10) Patent No.: US 12,209,217 B1
(45) Date of Patent: *Jan. 28, 2025

(54) CARBON DIOXIDE VISCOSIFICATION

(71) Applicant: The Lubrizol Corporation, Wickliffe, OH (US)

(72) Inventors: Binbin Guo, Sagamore Hills, OH (US); Abbas Firoozabadi, Los Altos, CA (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/640,037

(22) Filed: Apr. 19, 2024

(51) Int. Cl.
  *C09K 8/594*  (2006.01)
  *C09K 8/588*  (2006.01)
  *E21B 41/00*  (2006.01)

(52) U.S. Cl.
  CPC .............. *C09K 8/594* (2013.01); *C09K 8/588* (2013.01); *E21B 41/0064* (2013.01)

(58) Field of Classification Search
  None
  See application file for complete search history.

(56) References Cited

U.S. PATENT DOCUMENTS

| | | | | |
|---|---|---|---|---|
| 4,113,011 A * | 9/1978 | Bernard | ................. | C09K 8/594 |
| | | | | 507/936 |
| 4,913,235 A | 4/1990 | Harris et al. | | |
| 5,515,923 A * | 5/1996 | Loree | ................. | C09K 8/594 |
| | | | | 166/305.1 |
| 5,566,760 A * | 10/1996 | Harris | ................. | E21B 43/267 |
| | | | | 507/216 |
| 9,815,626 B2 | 11/2017 | Nazarian et al. | | |
| 9,850,421 B2 | 12/2017 | Abbas et al. | | |
| 10,870,719 B2 | 12/2020 | Lester et al. | | |
| 11,859,127 B2 * | 1/2024 | Guo | ................. | E21B 43/164 |
| | | | | 166/305.1 |
| 2012/0071367 A1 * | 3/2012 | Falana | ................. | C09K 8/38 |
| | | | | 507/203 |
| 2015/0041132 A1 * | 2/2015 | Nelson | ................. | C09K 8/76 |
| | | | | 166/305.1 |
| 2015/0083423 A1 * | 3/2015 | Brannon | ................. | C09K 8/62 |
| | | | | 166/292 |
| 2017/0159402 A1 * | 6/2017 | Nelson | ................. | E21B 21/00 |
| 2023/0272265 A1 * | 8/2023 | Guo | ................. | E21B 43/164 |
| | | | | 166/305.1 |

OTHER PUBLICATIONS

Carole Lepilleur, Eric J. Beckman, Hans Schonemann, & Val K. Krukonis, "Effect of Molecular Architecture on the Phase Behavior of Fluoroether-Functional Graft Copolymers in Supercritical CO2", Fluid Phase Equilibria, 1997, pp. 285-305, vol. 134, El Sevier, USA.

J.P. Heller, D.K. Dandge, R.J. Card & L.G. Donaruma, "Direct Thickeners for Mobility Control of CO2 Floods", Society of Petroleum Engineers Journal, Oct. 1985, pp. 679-686.

Shean-Jer Chen, Michal Banaszak, & Maciej Radoss, "Phase Behavior of Poly(ethylene-1-butene) in Subcritical and Supercritical Propane: Ethyl Branches Reduce Segment Energy and Enhance Miscilibity", Macromolecules, 1995, pp. 1812-1817, vol. 28, New Jersey, USA.

Shiyang Zhang, Yuehui She, and Yongan Gu. Evaluation of Polymers as Direct Thickeners for CO21069-1079, vol. 56, Petroleum Technology Research Center, Hubei, China.

Dandge, D. K., and J. P. Heller. "Polymers for Mobility Control in CO2 Floods." Paper presented at the SPE International Symposium on Oilfield Chemistry, San Antonio, Texas, Feb. 1987. doi: https://doi.org/10.2118/16271-MS (Year: 1987).

Gu, Y., Zhang, S. & She, Y. Effects of polymers as direct CO2 thickeners on the mutual interactions between a light crude oil and CO2. J Polym Res 20, 61 (2013). https://doi.org/10.1007/s10965-012-0061-9 (Year: 2013).

* cited by examiner

*Primary Examiner* — John J Figueroa
(74) *Attorney, Agent, or Firm* — Vincent A. Cortese; Michael A. Miller

(57) ABSTRACT

Provided is a composition including fluid carbon dioxide and a polyolefin thickener, wherein the polyolefin thickener includes a polymer of one or more olefin monomers having 8 or more carbon atoms, wherein at least 5 mol percent of the olefin monomers have 12 or more carbon atoms. Associated methods are also provided.

13 Claims, No Drawings

CARBON DIOXIDE VISCOSIFICATION

The disclosed technology relates to a composition for, and method of, increasing the viscosity of a carbon dioxide composition, as well as methods of increasing the sequestration of carbon dioxide (such as increasing the subsurface storage efficiency of sequestered carbon dixode), and/or methods for production and/or recovery of hydrocarbons from an underground formation employing the viscosified carbon dioxide composition.

There are many efforts to capture and store atmospheric carbon dioxide, such as in underground geologic formations (referred to as geologic carbon sequestration). Geologic carbon sequestration faces certain issues, including, for example, the potential for compressed supercritical carbon dioxide to escape the formation. The process of carbon dioxide sequestration from oil and gas production, and its usage in fossil fuel-fired electric power facilities and other stationary sources of carbon dioxide, is an important part of efforts to reduce greenhouse gas emissions. Governmental policies may mandate carbon dioxide sequestration in geologic repositories in the near future. These repositories include active and depleted oil and gas wells, saline aquifers, salt domes, and deep un-mineable coal deposits. Continuous fluid carbon dioxide injection tends to be problematic due to unfavorable mobility, viscous fingering/channeling, and early breakthrough of carbon dioxide, especially in the presence of reservoir heterogeneities. Modeling of supercritical carbon dioxide in reservoirs shows that the non-uniform distribution of carbon dioxide injection into the formation may have a negative effect on the overall usage of the storage capacities. Furthermore, unfavorable mobility can cause unwanted leakage of carbon dioxide back to the surface, thus defeating the reason for sequestration. Large scale implantation of carbon dioxide sequestration may be significantly limited without thickening of the fluid carbon dioxide for more effective mobility control and ultimately higher carbon dioxide storage capacity in formations.

In the recovery of hydrocarbons, such as oil or natural gas, from subterranean hydrocarbon-bearing formations or reservoirs, it is usually possible to recover only a limited proportion of the original hydrocarbons present in the reservoir by primary recovery methods that utilize the natural formation pressure to produce the hydrocarbons through suitable production wells. A variety of supplementary recovery techniques have therefore evolved to maintain formation pressure or improve hydrocarbon displacement. Water flooding, often enhanced with polymers and surfactants, is one method, but can come at an environmental cost. "Miscible flooding" is another common supplementary recovery technique to improve hydrocarbon displacement.

In the production of hydrocarbons, such as oil or natural gas, from subterranean hydrocarbon-bearing formations or reservoirs, a fluid, often water, is injected into the formation to fracture the formation and release the hydrocarbons therein. However, water fracking is carried out at high fracturing pressure, often resulting in the formation of main fractures lacking branching. This can further result in oil or gas that is stranded in the formation when the water phase isolates the oil as "islands" that don't mix with the water. The use of carbon dioxide as a fracturing fluid could help to reduce the use of other fluids, namely water, and the impacts of such use, as well as provide a convenient repository for excess carbon dioxide.

Miscible flooding involves introducing fluids into a formation that are miscible with the hydrocarbon to be displaced. One such fluid is carbon dioxide. Carbon dioxide is considered a miscible-type flooding agent because, under dense liquid and/or supercritical conditions, such as high pressure, carbon dioxide acts as a solvent. However, the low viscosity of dense liquid/supercritical carbon dioxide may limit its ability to sweep the oil that is targeted for enhanced recovery to the producing well (or zone). Thus, the use of carbon dioxide may be limited without thickening significantly for more effective mobility control and ultimately higher production rates.

The ability to increase carbon dioxide viscosity by a few times to an order of magnitude with environmentally friendly and cost-efficient thickening systems is key to using carbon dioxide for hydrocarbon production and recovery and sequestration and a pursuit of global oil and gas companies The disclosed technology solves the problem of thickening of carbon dioxide compositions in an efficient and environmentally friendly manner by adding to the composition a polyolefin thickener that increases the viscosity of fluid carbon dioxide.

The disclosed technology thus provides a composition comprising fluid carbon dioxide and a polyolefin thickener, wherein the polyolefin thickener comprises a polymer of one or more olefin monomers having 8 or more carbon atoms, wherein at least 5 mol percent of the olefin monomers have 12 or more carbon atoms.

The disclosed technology also includes a method to increase the production of hydrocarbons from an underground hydrocarbon-containing formation. The method includes injecting into the formation a composition as described herein and recovering released hydrocarbons from the hydrocarbon-containing formation.

The disclosed technology also includes a method of sequestering carbon dioxide. The method includes injecting into a subterranean formation a composition including a thickener as described herein.

The disclosed technology also includes a method of increasing the viscosity of supercritical carbon dioxide. The method includes adding to carbon dioxide a thickener. The thickener is at least one polyolefin that increases the viscosity of fluid carbon dioxide.

The following embodiments of the present subject matter are contemplated:

1. A composition comprising fluid carbon dioxide and a polyolefin thickener, wherein the polyolefin thickener comprises a polymer of one or more olefin monomers having 8 or more carbon atoms, wherein at least 5 mol percent of the olefin monomers have 12 or more carbon atoms.

2. The composition of embodiment 1, wherein the olefin monomers are alpha-olefin monomers having 8 or more carbon atoms.

3. The composition of either embodiment 1 or embodiment 2, wherein the polymer has a number average molecular weight of from 1,000 to 10,000 Daltons.

4. The composition of any one of embodiments 1 to 3, wherein the polymer has a number average molecular weight of 1,400 to 4,500 Daltons.

5. The composition of any one of embodiments 1 to 4, wherein the polyolefin thickener is present in an amount 0.01 to 5 weight percent, based on the total weight of the composition.

6. The composition of any one of embodiments 1 to 5, wherein the polyolefin thickener is present in an amount 0.1 to 4 weight percent, based on the total weight of the composition.

7. The composition of any one of embodiments 1 to 6, wherein the polyolefin thickener is present in an amount 0.25 to 2 weight percent, based on the total weight of the composition.

8. The composition of any one of embodiments 1 to 7, wherein the olefin monomers comprise at least one of 1-octene, 1-decene, 1-dodecene, 1-tetradecene, or 1-hexadecene.

9. The composition of any one of embodiments 1 to 8, wherein the olefin monomers comprise 5 to 60 mol percent 1-octene, 5 to 60 mol percent 1-dodecene, and 0 to 25 mol percent 1-decene.

10. The composition of any one of embodiments 1 to 9, wherein the olefin monomers comprise less than 5 mol percent 1-decene.

11. The composition of any one of embodiments 1 to 10, wherein the polyolefin is substantially free of, or free of, 1-decene.

12. The composition of any one of embodiments 1 to 11, wherein from 0.05 to 5 weight percent of the olefin monomers comprises at least one multifunctional monomer, based on the total weight of the polymer.

13. A method of improving oil recovery from subterranean formations, comprising injecting the formation with the composition of any one of embodiments 1 to 12.

14. A method of increasing the viscosity of fluid carbon dioxide, comprising dissolving 0.01 to 5 weight percent of a polyolefin thickener into the fluid carbon dioxide to create a viscosified fluid carbon dioxide composition, wherein the polyolefin thickener comprises a polymer of one or more olefin monomers having 8 or more carbon atoms, and wherein at least 5 mol percent of the olefin monomers have 12 or more carbon atoms.

15. The method of embodiment 14, further comprising sequestering the viscosified fluid carbon dioxide composition.

16. The method of embodiment 15, wherein the viscosified fluid carbon dioxide composition is sequestered in an underground formation.

DETAILED DESCRIPTION

Various features and embodiments of the present subject matter will be described below by way of non-limiting illustration.

As used herein, the term "hydrocarbyl" refers to a group having a carbon atom directly attached to the remainder of the molecule, where the group includes at least carbon and hydrogen atoms. If the hydrocarbyl group comprises more than one carbon atom, then those carbons need not necessarily be linked to each other. For example, at least two of the carbons may be linked via a suitable element or group. In various embodiments, the term "hydrocarbyl" refers to a group having a carbon atom directly attached to the remainder of the molecule, where the group consists of carbon, hydrogen, optionally one or more heteroatoms provided the heteroatoms do not alter the predominantly hydrocarbon nature of the substituent. The heteroatom may to link at least two of the carbons in the hydrocarbyl group, and optionally no more than two non-hydrocarbon substituents. Suitable heteroatoms will be apparent to those skilled in the art and include, for instance, sulphur, nitrogen, oxygen, phosphorus and silicon. Where the hydrocarbyl contains heteroatoms, optionally, no more than two heteroatoms will be present for every ten carbon atoms in the hydrocarbyl group. Suitable non-hydrocarbon substituents will also be apparent to those skilled in the art and include, for instance, halo, hydroxy, alkoxy, mercapto, alkylmercapto, nitro, nitroso, and sulphoxy.

Examples of hydrocarbyls within the context of the present technology therefore include: (i) hydrocarbon groups selected from aliphatic (e.g. alkyl or alkenyl), alicyclic (e.g. cycloalkyl, cycloalkenyl, cycloalkadienyl), and aromatic groups; (ii) substituted hydrocarbon groups, selected from hydrocarbon groups defined in (i) substituted with no more than two non-hydrocarbon substituents and/or one or more hydrocarbon substituents, the non-hydrocarbon substituents being selected from the group consisting of halo, hydroxy, alkoxy, mercapto, alkylmercapto, nitro, nitroso, and sulphoxy; and/or (iii) hetero-containing hydrocarbon groups, selected from hydrocarbon groups defined in (i) containing one or more heteroatom in the ring or chain, provided that the group has no more than two heteroatoms present for every ten carbon atoms in the group, the heteroatoms being selected from sulphur, nitrogen, oxygen, phosphorus and silicon. The hetero-containing hydrocarbon groups may be substituted with no more than two non-hydrocarbon substituents and/or one or more hydrocarbon substituents. In certain embodiments, the term "hydrocarbyl" refers to a group having a carbon atom directly attached to the remainder of the molecule, where the group consists of carbon and hydrogen atoms.

As used herein, the indefinite article "a"/"an" is intended to mean one or more than one. As used herein, the phrase "at least one" means one or more than one of the following terms. Thus, "a"/"an" and "at least one" may be used interchangeably. For example "at least one of A, B or C" means that just one of A, B or C may be included, and any mixture of two or more of A, B and C may be included, in alternative embodiments.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the essential or basic and novel characteristics of the composition or method under consideration.

The compositions described herein include carbon dioxide ($CO_2$). Carbon dioxide consists of two oxygen atoms covalently bonded to a single carbon atom. Carbon dioxide can exist as a solid, liquid, gas, or as a supercritical fluid (such as at temperatures above its critical point). Supercritical fluids are those that exhibit properties of both liquids (such as the ability to dissolve other substances) and of gases (such as the ability to effuse through solids). As a supercritical fluid, carbon dioxide can mix homogeneously, or in other words is miscible with, hydrocarbons, such as crude oil, and can therefore improve the recovery of such hydrocarbons. In certain embodiments, the fluid carbon dioxide is a liquid or a supercritical fluid. The term "dense $CO_2$" may be used to describe $CO_2$ which is in a liquid state or a supercritical fluid state, as it may sometimes be hard to distinguish between these two states under certain conditions; the term "dense liquid" has the same meaning when referring to fluid carbon dioxide. In certain embodiments, the fluid carbon dioxide is a liquid, a supercritical fluid, or a dense liquid.

The polyolefin polymer may have a number average molecular weight of from 1,000 to 10,000 Daltons, as measured by gel permeation chromatography ("GPC") with polystyrene standard.

The carbon dioxide composition may contain the polyolefin thickener at from 0.01 to 5 wt. %, based on the total weight of the composition.

In certain embodiments, the polyolefin thickener comprises a polymer of one or more olefin monomers having from 8 to 18 carbon atoms. In certain embodiments, the polyolefin thickener comprises a polymer of one or more olefin monomers having from 8 to 16 carbon atoms. In certain embodiments, the polyolefin thickener comprises a polymer of one or more olefin monomers having from 8 to 14 carbon atoms. In certain embodiments, the polyolefin thickener comprises a polymer of one or more olefin monomers having from 8 to 12 carbon atoms. In certain embodiments, the polyolefin thickener comprises a polymer of one or more olefin monomers having from 10 to 18 carbon atoms. In certain embodiments, the polyolefin thickener comprises a polymer of one or more olefin monomers having from 10 to 16 carbon atoms. In certain embodiments, the polyolefin thickener comprises a polymer of one or more olefin monomers having from 10 to 14 carbon atoms. In certain embodiments, the polyolefin thickener comprises a polymer of one or more olefin monomers having from 10 to 12 carbon atoms. In certain embodiments, the polyolefin thickener comprises a polymer of one or more olefin monomers having from 12 to 18 carbon atoms. In certain embodiments, the polyolefin thickener comprises a polymer of one or more olefin monomers having from 12 to 16 carbon atoms. In certain embodiments, the polyolefin thickener comprises a polymer of one or more olefin monomers having from 12 to 14 carbon atoms.

In certain embodiments, at least 5 (such as at least 10, at least 20, at least 30, at least 40, at least 50, at least 60, at least 70, at least 80, at least 90, at least 95, or at least 99) mol percent of the olefin monomers have 12 or more carbon atoms. In certain embodiments, from 5 to 100 (such as from 5 to 99, from 5 to 95, from 5 to 90, from 5 to 80, from 5 to 70, from 5 to 60, from 5 to 50, from 5 to 40, from 5 to 30, from 5 to 20, from 10 to 100, from 10 to 99, from 10 to 95, from 10 to 90, from 10 to 80, from 10 to 70, from 10 to 60, from 10 to 50, from 10 to 40, from 10 to 30, from 10 to 20, from 20 to 100, from 20 to 99, from 20 to 95, from 20 to 90, from 20 to 80, from 20 to 70, from 20 to 60, from 20 to 50, from 20 to 40, from 20 to 30, from 30 to 100, from 30 to 99, from 30 to 95, from 30 to 90, from 30 to 80, from 30 to 70, from 30 to 60, from 30 to 50, from 30 to 40, from 40 to 100, from 40 to 99, from 40 to 95, from 40 to 90, from 40 to 80, from 40 to 70, from 40 to 60, from 40 to 50, from 50 to 100, from 50 to 99, from 50 to 95, from 50 to 90, from 50 to 80, from 50 to 70, from 50 to 60, from 60 to 100, from 60 to 99, from 60 to 95, from 60 to 90, from 60 to 80, from 60 to 70, from 70 to 100, from 70 to 99, from 70 to 95, from 70 to 90, from 70 to 80, from 80 to 100, from 80 to 99, from 80 to 95, from 80 to 90, from 90 to 100, from 90 to 99, from 90 to 95, from 95 to 100, from 95 to 99, or from 99 to 100) mol percent of the olefin monomers have 12 or more carbon atoms.

The carbon dioxide composition includes at least one polyolefin thickener. In certain embodiments, the polyolefin employed in the carbon dioxide composition may be derivable (or derived) from olefins (such as alpha-olefines) with 8 to 18 carbon atoms, wherein at least 5 mol percent of the olefin monomers contain at least 12 carbon atoms.

As used herein, the term "olefin" refers to an unsaturated hydrocarbon compound having a hydrocarbon chain containing at least one carbon-to-carbon double bond in the structure thereof, wherein the carbon-to-carbon double bond does not constitute a part of an aromatic ring. The olefin may be straight-chain, branched-chain, or cyclic. "Olefin" is intended to embrace all structural isomeric forms of olefins, unless it is specified to mean a single isomer, or the context clearly indicates otherwise.

By "derivable from" or "derived from", it is meant that the polyolefin is polymerized from the described starting polymerizable olefin monomers. In certain embodiments, the polyolefin employed in the carbon dioxide composition may be derivable (or derived) from olefins with 8 to 18 carbon atoms, wherein at least 5 mol percent of the olefin monomers have at least 12 carbon atoms. In certain embodiments, the polyolefin employed in the carbon dioxide composition may be derivable (or derived) from olefins with 8 to 16 carbon atoms. In still further embodiments, the polyolefin employed in the carbon dioxide composition may be derivable (or derived) from olefins with 8 to 12 carbon atoms.

In certain embodiments, the polyolefin thickener comprises monomers containing 8 carbon atoms or more, wherein at least 5 mol percent, or at least 10 mol percent, or at least 20 mol percent, or at least 40 mol percent of the monomers contain 12 or more carbon atoms.

In certain embodiments the polyolefin comprises copolymers of 1-octene, 1-decene, 1-dodecene, 1-tetradecene, or any combination thereof, such that at least 5 mol percent of the monomers comprise 1-dodecene or 1-tetradecene or mixtures thereof. In certain embodiments, the olefin monomers comprise 5 to 60 mol percent 1-octene, 5 to 60 mol percent 1-dodecene, and 0 to 25 mol percent 1-decene. In certain embodiments, the olefin monomers comprise less than 5 mol percent 1-decene. In certain embodiments, the polyolefin is substantially free of, or free of, 1-decene monomer.

As used herein, the term "substantially free of" means that a component does not include any intentional addition of the material which the component is "substantially free of". For example, the component may include a material which the component is "substantially free of" at no more than impurity levels, which may be the result of incomplete chemical reactions and/or unintended/undesired (but perhaps unavoidable) reaction products.

As used herein, the term "carbon backbone" of a polyolefin is defined as the straight carbon chain therein having the largest number of carbon atoms.

As used herein, the term "branching group" with respect to a polyolefin refers to any group other than hydrogen attached to the carbon backbone of the polyolefin, other than those attached to the carbon atoms at the very ends of the carbon backbone.

Polyolefins also include poly-α-olefins derivable (or derived) from α-olefins. As used herein, the term "alpha-olefin" (also referred to as "α-olefin") refers to an olefin having a terminal carbon-to-carbon double bond $((R^1R^2)-C=CH_2)$ in the structure thereof. As used herein, "polyalpha-olefin(s)" (singular, "PAO", or plural, "PAOs") includes any oligomer(s) and/or polymer(s) of one or more alpha-olefin monomer(s). PAOs are oligomeric or polymeric molecules produced from the polymerization reactions of alpha-olefin monomer molecules in the presence of a catalyst system, optionally further hydrogenated to remove residual carbon-carbon double bonds therein. Thus, the PAO can be a dimer, a trimer, a tetramer, or any other oligomer or polymer comprising two or more structural units derived from one or more alpha-olefin monomer(s). The PAO molecule can be highly regio-regular, such that the bulk material exhibits an isotacticity, or a syndiotacticity when measured by $^{13}$C NMR. The PAO molecule can be highly regio-irregular, such that the bulk material is substantially atactic when measured by $^{13}$C NMR. A PAO material made by using a metallocene-based catalyst system is typically called a metallocene-PAO ("mPAO"), and a PAO material made by using traditional non-metallocene-based catalysts (e.g., Lewis acids, supported chromium oxide, and the like) is typically called a conventional PAO ("cPAO"). The poly-α-olefins used herein may be mPAOs. The poly-α-olefins used herein may also be cPAOs.

The α-olefins may be linear or branched, or mixtures thereof. Examples include mono-olefins such as 1-octene, 1-nonene, 1-decene, etc. Other examples of α-olefins include 1-decene, 1-undecene, 1-dodecene, 1-tridecene, 1-tetradecene, 1-pentadecene, 1-hexadecene, 1-heptadecene 1-octadecene, and mixtures thereof. Other examples of α-olefins include 1-nonadecene, 1-cicosene, 1-heneicosene, 1-docosene, 1-tricosene, 1-tetracosene in yet another embodiment. Preferred LAO feeds are 1-hexene, 1-octene, 1-decene, 1-dodecene, 1-tetradecene, 1-hexadecene and 1-octadecene. Examples of preferred α-olefin mixtures as monomers for making the poly-α-olefins include, but are not limited to: $C_8/C_{12}$; $C_8/C_{14}$; $C_8/C_{16}$; $C_8/C_{10}/C_{12}$; $C_8/C_{10}/C_{14}$; $C_8/C_{10}/C_{16}$; $C_{10}/C_{12}$; $C_{10}/C_{14}$; $C_{10}/C_{16}$; $C_{10}/C_{12}/C_{14}$; $C_{10}/C_{12}/C_{16}$; and the like. An example of a useful α-olefin is 1-dodecene.

An example of a useful poly-α-olefin is poly-dodecene.

In certain embodiments, the olefin monomers are alpha-olefin monomers having 8 (such as 10 or 12) or more carbon atoms. In certain embodiments, the olefin monomers are alpha-olefin monomers having from 8 to 18 carbon atoms. In certain embodiments, the olefin monomers are alpha-olefin monomers having from 8 to 16 carbon atoms. In certain embodiments, the olefin monomers are alpha-olefin monomers having from 8 to 14 carbon atoms. In certain embodiments, the olefin monomers are alpha-olefin monomers having from 8 to 12 carbon atoms. In certain embodiments, the olefin monomers are alpha-olefin monomers having from 10 to 18 carbon atoms. In certain embodiments, the olefin monomers are alpha-olefin monomers having from 10 to 16 carbon atoms. In certain embodiments, the olefin monomers are alpha-olefin monomers having from 10 to 14 carbon atoms. In certain embodiments, the olefin monomers are alpha-olefin monomers having from 10 to 12 carbon atoms. In certain embodiments, the olefin monomers are alpha-olefin monomers having from 12 to 18 carbon atoms. In certain embodiments, the olefin monomers are alpha-olefin monomers having from 12 to 16 carbon atoms. In certain embodiments, the olefin monomers are alpha-olefin monomers having from 12 to 14 carbon atoms.

The composition may be substantially free of, or free of, ethylene and polymers thereof. The composition may be substantially free of, or free of, propylene and polymers thereof.

The polyolefin polymers prepared from the aforementioned olefin monomers may have a number average molecular weight of from 1,000 to 10,000 Daltons, as measured by gel permeation chromatography with a polystyrene standard. The polyolefin polymers prepared from the aforementioned olefin monomers may have a number average molecular weight of from 1,200 to 4,750 Daltons, as measured by gel permeation chromatography with a polystyrene standard. The polyolefin polymers prepared from the aforementioned olefin monomers may have a number average molecular weight of from 1,400 to 4,500 Daltons, as measured by gel permeation chromatography with a polystyrene standard. The polyolefin polymers prepared from the aforementioned olefin monomers may have a number average molecular weight of from 1,500 to 4,000 Daltons, as measured by gel permeation chromatography with a polystyrene standard. The polyolefin polymers prepared from the aforementioned olefin monomers may have a number average molecular weight of from 1,500 to 4,000 Daltons, as measured by gel permeation chromatography with a polystyrene standard.

Some of the polyolefins may include branching by virtue of the structure of the polymer. For example, the polymerization of α-olefins along the α bond results in the tails of these monomers branching along the polymerized α-olefin. The longer the α-olefin, the longer the branches off of the resultant polyolefin. Polydodecene, for example, may result in a polymer having branches of ten carbon atoms.

An illustrative hydrogenated PAO molecule may be represented by the following formula:

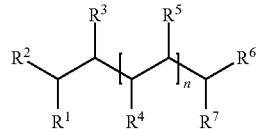

where $R^1$, $R^2$, $R^3$, each of $R^4$ and $R^5$, $R^6$, and $R^7$, are the same or different at each occurrence, and independently represent hydrogen, or a substituted or unsubstituted hydrocarbyl (such as an alkyl) group, and n is zero, or a non-negative integer corresponding to the degree of polymerization Where n is 0, the formula represents a dimer produced from the reaction of two monomer molecules after a single addition reaction between two carbon-carbon double bonds. Where n is a non-negative integer, the formula represents a molecule produced from the reactions of n+2 monomer molecules after n+1 steps of addition reactions between two carbon-carbon double bonds. Where n is 1, for example, the formula represents a trimer produced from the reactions of three monomer molecules after two steps of addition reactions between two carbon-carbon double bonds.

Assuming a carbon chain starting from $R^1$ and ending with $R^7$ has the largest number of carbon atoms among all carbon chains existing in the formula above, then the carbon chain starting from $R^1$ and ending with $R^7$ constitutes the carbon backbone of the poly-α-olefin molecule of the formula. $R^2$, $R^3$, each of $R^4$ and $R^5$, and $R^6$, which can be substituted or unsubstituted hydrocarbyls (preferably alkyl) groups, are branching groups (if not hydrogen).

If only alpha-olefin monomers are used in the polymerization process, and no isomerization of the monomers and oligomers ever occurs in the reaction system during polymerization, about half of $R^1$, $R^2$, $R^3$, all $R^4$ and $R^5$, $R^6$, and $R^7$ would be hydrogen, and one of $R^1$, $R^2$, $R^6$, and $R^7$ would be a methyl, and about half of groups $R^1$, $R^2$, $R^3$, all $R^4$ and $R^5$, $R^6$, and $R^7$ would be hydrocarbyl groups introduced from the alpha-olefin monomer molecules. In a specific example of such a case, assuming $R^2$ is methyl, $R^3$, all $R^5$, and $R^6$ are hydrogen, and $R^1$, all $R^4$, and $R^7$ have 8 carbon atoms in the longest carbon chains contained therein, and n is 8, then the carbon backbone of the PAO molecule would comprise 35 carbon atoms, and the average branching group length of the branching groups ($R^2$, all of $R^4$) would be 7.22 (i.e., (1+8*8)/9). This PAO molecule, which can be produced by polymerizing 1-decene using certain metallocene catalyst systems described in greater detail below, can be represented by the following formula:

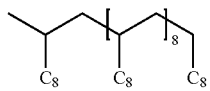

PAO base stocks useful for the present subject matter may include a homopolymer made from a single alpha-olefin monomer containing 12 or more carbon atoms or a copolymer made from a combination of two or more alpha-olefin monomers where at least 5 mol percent of one of the monomers has 12 or more carbon atoms.

In certain embodiments, there is provided a 1,000 to 10,000 Dalton molecular weight PAO polymer, such as a polydodecene polymer, as measured by gel permeation chromatography with a polystyrene standard. The PAO polymer, such as copolymers of octene and decene, may have a number average molecular weight of from 1,250 to 5,000 Dalton, as measured by gel permeation chromatography with a polystyrene standard. The PAO polymer, such as copolymers of octene and decene, may have a number average molecular weight of from 1,500 to 4,500 Daltons, as measured by gel permeation chromatography with a polystyrene standard. The PAO polymer, such as polydecene, may have a number average molecular weight of from 2,000 to 4,250 Daltons, as measured by gel permeation chromatography with a polystyrene standard. The PAO polymer, such as copolymers of octene and dodecene, may have a number average molecular weight of from 2,500 to 4,000 Daltons, as measured by gel permeation chromatography with a polystyrene standard.

The polyolefins may also be functionalized with substituents to add branching along the polyolefin backbone. For example, the polyolefin may be functionalized with at least one of an aromatic hydrocarbyl group, an aliphatic hydrocarbyl group, or a cyclic hydrocarbyl group, such that the branching of the branched polyolefin polymer includes at least one of an aromatic hydrocarbyl group, an aliphatic hydrocarbyl group, or a cyclic hydrocarbyl group.

In certain embodiments, the polyolefin may be functionalized with at least one aromatic hydrocarbyl group, such that the branching of the branched polyolefin polymer includes at least one aromatic hydrocarbyl group. The aromatic hydrocarbyl group may be, for example, a hydroxyl containing aromatic group, such as a phenol group, an amine containing aromatic group, such as, for example, aniline, and mixtures thereof. Other aromatic groups may include, for example, phenylmethylene; o-heptyl-phenylmethylene; and p-heptylphenylmethylene; aniline and alkyl anilines; indole and alkyl indoles; quinoline and alkyl quinoline; isoquinoline and alkyl isoquinoline; pyrazine and alkyl pyrazine; quinoxaline and alkyl quinoxaline; acridine and alkyl acridine; pyrimidine and alkyl pyrimidine;

quinazoline and alkyl quinazoline. The aromatic group can also be a polyaromatic group, such as, for example, naphthalene, naphthol or other homologues of phenol with fused aromatic rings, naphthylamine or other homologues of aniline.

In certain embodiments, the aromatic group is a hydroxyl containing aromatic group. In certain embodiments, the aromatic group is a phenol group. In certain embodiments, the aromatic group is an amine containing aromatic group. In certain embodiments, the aromatic group is a hydroxyl and amine containing aromatic group. In certain embodiments, the aromatic group is a 2-((dimethylamino)methyl) phenol group.

In certain embodiments, the polyolefin may be functionalized with at least one aliphatic hydrocarbyl group, so that the branching of the branched polyolefin polymer includes at least one aliphatic hydrocarbyl group.

In certain embodiments, the polyolefin may be functionalized with at least one cyclic hydrocarbyl group, so that the branching of the branched polyolefin polymer includes at least one cyclic hydrocarbyl group. An example cyclic group includes, for example, cyclohexylmethylene. Other cyclic groups may include heterocyclic groups, such as pyridines and alkyl pyridines, pyrrole and alkyl pyrroles, piperidine and alkyl piperidines, pyrrolidine and alkyl pyrrolidines, and/or imidazole and alkyl imidazole. Other cyclic groups may include, vinyl-pyridine and/or vinylimidazole, as well as styrene.

In certain embodiments, the polyolefin may be coupled or cross-linked by incorporation of multifunctional monomers. Multifunctional monomers, which are those having more than one functional group that participates in the reaction pathway, include un-conjugated dienes, such as 1,4-pentadiene, 1,5-hexadiene, divinyl benzene, and conjugated dienes, such as isoprene and butadiene. Multifunctional olefins may also include molecules that contain functional groups, although not olefinic in nature, that may take part in the reaction process in a similar way as olefins. Such functional group include alkyl halides and alcohols. Multifunctional or cross-linking monomers may be present in the polyolefin in an amount less than 5 wt % of the total monomer composition, or 0.05 to 5 weight percent, or 0.1 to 3 weight percent, or 0.5 to 2 weight percent of the composition.

The composition may include the polyolefin thickener in an amount from 0.01 to 5 wt. %, based on the total weight of the composition. The composition may include the polyolefin thickener in an amount from 0.01 to 4 wt. %, based on the total weight of the composition. The composition may include the polyolefin thickener in an amount from 0.01 to 3 wt. %, based on the total weight of the composition. The composition may include the polyolefin thickener in an amount from 0.01 to 2 wt. %, based on the total weight of the composition. The composition may include the polyolefin thickener in an amount from 0.01 to 1 wt. %, based on the total weight of the composition. The composition may include the polyolefin thickener in an amount from 0.01 to 0.5 wt. %, based on the total weight of the composition. The composition may include the polyolefin thickener in an amount from 0.05 to 5 wt. %, based on the total weight of the composition. The composition may include the polyolefin thickener in an amount from 0.05 to 4 wt. %, based on the total weight of the composition. The composition may include the polyolefin thickener in an amount from 0.05 to 3 wt. %, based on the total weight of the composition. The composition may include the polyolefin thickener in an amount from 0.05 to 2 wt. %, based on the total weight of the composition. The composition may include the polyolefin thickener in an amount from 0.05 to 1 wt. %, based on the total weight of the composition. The composition may include the polyolefin thickener in an amount from 0.05 to 0.5 wt. %, based on the total weight of the composition. The composition may include the polyolefin thickener in an amount from 0.1 to 5 wt. %, based on the total weight of the composition. The composition may include the polyolefin thickener in an amount from 0.1 to 4 wt. %, based on the total weight of the composition. The composition may include the polyolefin thickener in an amount from 0.1 to 3 wt. %, based on the total weight of the composition. The composition may include the polyolefin thickener in an amount from 0.1 to 2 wt. %, based on the total weight of the composition. The composition may include the polyolefin thickener in an amount from 0.1 to 1 wt. %, based on the total weight of the composition. The composition may include the polyolefin thickener in an amount from 0.1 to 0.5 wt. %, based on the total weight of the composition. The composition may include the polyolefin thickener in an amount from 0.2 to 5 wt. %, based on the total weight of the composition. The composition may include the polyolefin thickener in an amount from 0.2 to 4 wt. %, based on the total weight of the composition. The composition may include the polyolefin thickener in an amount from 0.2 to 3 wt. %, based on the total weight of the composition. The composition may include the polyolefin thickener in an amount from 0.2 to 2 wt. %, based on the total weight of the composition. The composition may include the polyolefin thickener in an amount from 0.2 to 1 wt. %, based on the total weight of the composition. The composition may include the polyolefin thickener in an amount from 0.2 to 0.5 wt. %, based on the total weight of the composition. The composition may include the polyolefin thickener in an amount from 0.3 to 5 wt. %, based on the total weight of the composition. The composition may include the polyolefin thickener in an amount from 0.3 to 4 wt. %, based on the total weight of the composition. The composition may include the polyolefin thickener in an amount from 0.3 to 3 wt. %, based on the total weight of the composition. The composition may include the polyolefin thickener in an amount from 0.3 to 2 wt. %, based on the total weight of the composition. The composition may include the polyolefin thickener in an amount from 0.3 to 1 wt. %, based on the total weight of the composition. The composition may include the polyolefin thickener in an amount from 0.3 to 0.5 wt. %, based on the total weight of the composition. The composition may include the polyolefin thickener in an amount from 0.4 to 5 wt. %, based on the total weight of the composition. The composition may include the polyolefin thickener in an amount from 0.4 to 4 wt. %, based on the total weight of the composition. The composition may include the polyolefin thickener in an amount from 0.4 to 3 wt. %, based on the total weight of the composition. The composition may include the polyolefin thickener in an amount from 0.4 to 2 wt. %, based on the total weight of the composition. The composition may include the polyolefin thickener in an amount from 0.4 to 1 wt. %, based on the total weight of the composition. The composition may include the polyolefin thickener in an amount from 0.4 to 0.5 wt. %, based on the total weight of the composition. The composition may include the polyolefin thickener in an amount from 0.5 to 5 wt. %, based on the total weight of the composition. The composition may include the polyolefin thickener in an amount from 0.5 to 4 wt. %, based on the total weight of the composition. The composition may include the polyolefin thickener in an amount from 0.5 to 3 wt. %, based on the total weight of the composition. The composition may include the polyolefin thickener in an amount from 0.5 to 2 wt. %, based on the total weight of the composition. The composition may include the polyolefin thickener in an amount from 0.5 to 1 wt. %, based on the total weight of the composition.

In certain embodiments, the olefin monomers comprise 5 to 60 (such as 10 to 60, 15 to 60, 20 to 60, 25 to 60, 30 to 60, 35 to 60, 40 to 60, 45 to 60, 50 to 60, 55 to 60, 5 to 55, 10 to 55, 15 to 55, 20 to 55, 25 to 55, 30 to 55, 35 to 55, 40 to 55, 45 to 55, 50 to 55, 5 to 50, 10 to 50, 15 to 50, 20 to 50, 25 to 50, 30 to 50, 35 to 50, 40 to 50, 45 to 50, 5 to 45, 10 to 45, 15 to 45, 20 to 45, 25 to 45, 30 to 45, 35 to 45, 40 to 45, 5 to 40, 10 to 40, 15 to 40, 20 to 40, 25 to 40, 30 to 40, 35 to 40, 5 to 35, 10 to 35, 15 to 35, 20 to 35, 25 to 35, 30 to 35, 5 to 30, 10 to 30, 15 to 30, 20 to 30, 25 to 30, 5 to 25, 10 to 25, 15 to 25, 20 to 25, 5 to 20, 10 to 20, 15 to 20, 5 to 15, 10 to 15, or 5 to 10) mol percent 1-octene, 5 to 60 (such as 10 to 60, 15 to 60, 20 to 60, 25 to 60, 30 to 60, 35 to 60, 40 to 60, 45 to 60, 50 to 60, 55 to 60, 5 to 55, 10 to 55, 15 to 55, 20 to 55, 25 to 55, 30 to 55, 35 to 55, 40 to 55, 45 to 55, 50 to 55, 5 to 50, 10 to 50, 15 to 50, 20 to 50, 25 to 50, 30 to 50, 35 to 50, 40 to 50, 45 to 50, 5 to 45, 10 to 45, 15 to 45, 20 to 45, 25 to 45, 30 to 45, 35 to 45, 40 to 45, 5 to 40, 10 to 40, 15 to 40, 20 to 40, 25 to 40, 30 to 40, 35 to 40, 5 to 35, 10 to 35, 15 to 35, 20 to 35, 25 to 35, 30 to 35, 5 to 30, 10 to 30, 15 to 30, 20 to 30, 25 to 30, 5 to 25, 10 to 25, 15 to 25, 20 to 25, 5 to 20, 10 to 20, 15 to 20, 5 to 15, 10 to 15, or 5 to 10) mol percent 1-dodecene, and 0 to 25 (such as 0 to 20, 0 to 15, 0 to 10, 0 to 5, 1 to 25, 1 to 20, 1 to 15, 1 to 10, 1 to 5, 2 to 25, 2 to 20, 2 to 15, 2 to 10, 2 to 5, 3 to 25, 3 to 20, 3 to 15, 3 to 10, 3 to 5, 4 to 25, 4 to 20, 4 to 15, 4 to 10, or 4 to 5) mol percent 1-decene (with the obvious proviso that the total mol percent of all monomers cannot exceed 100 mol percent).

In certain embodiments, the olefin monomers comprise less than 5 (such as less than 4, less than 3, less than 2, less than 1, less than 0.5, or less than 0.1) mol percent 1-decene. In certain embodiments, the polyolefin is substantially free of, or free of, 1-decene.

One purpose of the polyolefin thickener is to increase the viscosity of fluid carbon dioxide. The absolute viscosity of fluid carbon dioxide will vary depending on the temperature and pressure at which the viscosity is measured, but has been seen to be about 0.07 cP at 2000 psi and 0.09 cP at 2900 psi as measured by viscometer. The polyolefin thickener can be dosed into the fluid carbon dioxide to increase the viscosity of the composition relative to the starting supercritical carbon dioxide viscosity, up to the point at which the fluid carbon dioxide becomes un-flowable. Viscosities described herein my be determined by any suitable method, such as the method(s) described below with respect to the examples provided below, or any other method described herein, for example.

In certain embodiments, the polyolefin thickener may be dosed into the carbon dioxide composition to increase the relative viscosity of the composition by at least 100%, which may also be referred to as 2 times or "2×", meaning the absolute viscosity of the carbon dioxide composition is 100% greater than the absolute viscosity of the fluid carbon dioxide on its own. For example, if the absolute viscosity of the fluid carbon dioxide is 0.05 cP, a relative viscosity 100% greater would be 0.05+ (0.05)*100%=0.1 cP, or 2 times. In certain embodiments, the polyolefin thickener may be dosed into the carbon dioxide composition to increase the relative viscosity of the composition from about 100% to about the point at which the composition does not flow freely, such as about 1, 2, 3, 3.5, 4, 4.5, or 5 orders of magnitude, or more. As used herein, "order of magnitude" means approximately a factor of 10. In certain embodiments, the polyolefin thickener may be dosed into the carbon dioxide composition to increase the relative viscosity of the composition by at least 150%, which may also be referred to as 2.5 times or "2.5×." In certain embodiments, the polyolefin thickener may be dosed into the carbon dioxide composition to increase the relative viscosity of the composition from about 150% to about the point at which the composition does not flow freely, such as about 1, 2, 3, 3.5, 4, 4.5, or 5 orders of magnitude or more. In certain embodiments, the polyolefin thickener may be dosed into the carbon dioxide composition to increase the relative viscosity of the composition by at least 200%, which may also be referred to as 3 times or "3×." In certain embodiments, the polyolefin thickener may be dosed into the carbon dioxide composition to increase the relative viscosity of the composition from about 200% to about the point at which the composition does not flow freely, such as about 1, 2, 3, 3.5, 4, 4.5, or 5 orders of magnitude or more. In certain embodiments, the polyolefin thickener may be dosed into the carbon dioxide composition to increase the relative viscosity of the composition by at least 250%, or 3.5×. In certain embodiments, the polyolefin thickener may be dosed into the carbon dioxide composition to increase the relative viscosity of the composition from about 250% to about the point at which the composition does not flow freely, such as about 1, 2, 3, 3.5, 4, 4.5, or 5 orders of magnitude or more. In certain embodiments, the polyolefin thickener may be dosed into the carbon dioxide composition to increase the relative viscosity of the composition by at least 300% or 4×. In certain embodiments, the polyolefin polymer may be dosed into the carbon dioxide composition to increase the relative viscosity of the composition from about 300% to about the point at which the composition does not flow freely, such as about 1, 2, 3, 3.5, 4, 4.5, or 5 orders of magnitude or more.

Given the temperatures and/or pressures involved with obtaining supercritical carbon dioxide, measurements of absolute viscosity may be difficult and may provide slightly differing results in different circumstances. However, when comparing viscosity between two samples out of the same well by the same measurement method (i.e., viscosity of supercritical carbon dioxide to viscosity of carbon dioxide composition containing the polyolefin polymer) the relative viscosity trends should be the same or similar between methods (such as that the results would not be statistically significantly different). Thus, the relative viscosity numbers herein may be arrived at by measure of the absolute viscosity of the comparable samples by any reasonable test method. One method may be to employ a viscometer. Dynamic viscosity may be measured on a rotational viscometer. Viscometers of this type measure the torque necessary to rotate a weighted disk at a set rpm.

One useful measure to screen polyolefin polymers for use in the compositions described herein may be to check the solubility of the polymer in supercritical carbon dioxide. In general, the more soluble a second substance is in a first substance, the more available the second substance is to act on the first substance. While complete solubility is desired, a partially-soluble polymer may also provide viscosity improvements. The solubility of the polymer may be measured by methods known in the art, such as, for example, by visual inspection or cloud point. In certain embodiments, the solubility of the polyolefin polymer in the carbon dioxide composition may be measured by a sapphire rocking cell test. The sapphire rocking cell test employs an apparatus having two rocking cells generally of about 20 mL volume, each equipped with a stainless steel ball to aid agitation. Each cell is charged with a designated volume of the chosen branched polyolefin polymer and injected with carbon dioxide to a desired supercritical carbon dioxide pressure. The cells are then submerged in a constant temperature water bath. The cells are rocked in the water bath from a 45° angle to a −45° angle at a pre-determined rocking frequency, for example, 15 times/min. The water bath is brought to the desired temperature and the sapphire cells are observed for solubility of the polyolefin polymer in the supercritical carbon dioxide. If the polyolefin is completely soluble in the supercritical carbon dioxide at the given pressure and temperature, the supercritical mixture will appear homogeneous. Otherwise, separate phases will be observed in the cells.

In some cases, the pressure actually necessitated for solubility of the hydrocarbons in the supercritical carbon dioxide may depend upon the minimum miscibility pressure ("MMP") of the hydrocarbons present. The MMP may be found by simple experiment, using samples of the hydrocarbons from the reservoir and the carbon dioxide composition, which anyone skilled in the art would be readily able to perform.

An aspect of the disclosed technology is the use of the polyolefin thickeners described herein to thicken carbon dioxide. Thus, the technology provides a method of increasing the viscosity of supercritical carbon dioxide. The method can include adding to carbon dioxide a thickener, such as the polyolefin thickener described herein. The thickener may comprise at least one polyolefin polymer that increases the viscosity of fluid carbon dioxide. The method can further include pressurizing the carbon dioxide composition at a temperature to cause the formation of fluid carbon dioxide. It is understood that dense carbon dioxide may be injected above the critical pressure, but the temperature may be below that of critical temperature. As the injected carbon dioxide travels down and into the formation, it will often warm up to the same temperature of the formation, which may be above the critical point, and may therefore result in supercritical carbon dioxide as the carbon dioxide reaches the temperature of the formation.

The carbon dioxide composition described herein may be employed to sequester carbon dioxide in an underground formation, as well as to recover hydrocarbons from an underground hydrocarbon-containing formation.

Hydrocarbons can be recovered from an underground hydrocarbon-containing formation or reservoir by injecting a solvent (carbon dioxide in this case) into the reservoir through an injection well and recovering hydrocarbon-containing fluids from a production well which is at a horizontal distance or offset from the injection well. In practice, more than one injection well and more than one production well may be used and these may be arranged in a number of different patterns suitable for solvent drive operations of this kind. For simplicity, however, the present subject matter is described below with reference only to a single injection well and a single production well.

The carbon dioxide composition as described herein may be injected under sufficient pressure so that under the conditions which prevail in the reservoir, the carbon dioxide in the composition is present as a dense phase, that is, it is under supercritical conditions and present neither as a liquid or a dense vapor. Generally, this will be achieved by maintaining pressure in the reservoir sufficiently high to maintain the carbon dioxide in the dense phase state, such as at a density greater than approximately 0.468 g/cm$^3$. This pressure, in itself, increases with increasing reservoir temperature and the pressure should therefore be chosen in accordance with reservoir temperature, which may be determined by calculations known to or easily derivable by those of ordinary skill in the art. The method of viscosity increase discussed herein may be employed at pressures of 500 psia or greater, such as up to 10,000 psia, or for example 750 to 6,000 psia. Illustrative minimum pressures for maintaining the dense phase state are 900 psia at 85° F., 1,200 psia at 100° F., 1,800 psia at 150° F., 2,500 psia at 200° F. and 3,100 psia at 250° F. (6,205 kPa at 30° C., 8,275 kPa at 38° C., 12,410 kPa at 65° C., 17,235 kPa at 93° C. and 21,375 kPa at 120° C.).

Thus, the method of recovering hydrocarbons from an underground hydrocarbon-containing formation may involve at least some, if not all, of the following steps, not necessarily in the following order: determining the temperature and pressure of the hydrocarbon formation; screening for a suitable polyolefin by, for example, either determining the solubility of the at least one polyolefin at the temperature and pressure encountered in the formation, which may be done, for example, by performing the sapphire rocking cell test, or determining the MMP of the hydrocarbons present; selecting the at least one polyolefin;

injecting into the hydrocarbon formation a carbon dioxide composition containing carbon dioxide and the at least one polyolefin; and recovering released hydrocarbons from the hydrocarbon-containing formation.

The amount of each chemical component described is presented exclusive of any solvent or diluent oil, which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present subject matter in its intended use, may not be susceptible of easy description. Nevertheless, all such modifications and reaction products are included within the scope of the present subject matter; the present subject matter encompasses the composition prepared by admixing the components described above.

The subject matter disclosed herein may be better understood with reference to the following examples, which are set forth merely to further illustrate the subject matter disclosed herein. The illustrative examples should not be construed as limiting the subject matter in any manner.

A series of polyolefin thickeners were evaluated for their effectiveness at increasing the viscosity of fluid carbon dioxide under specific temperature and pressure conditions. Polyolefins include those made from 1-octene, 1-decene, 1-dodecene, 1-hexadecene, and various combinations thereof as shown in Table 1.

TABLE 1

| | PAO1 | PAO2 | PAO3 | PAO4 | PAO5 | PAO6 | PAO7 | PAO8[5] |
|---|---|---|---|---|---|---|---|---|
| 1-octene[1] | 100 | | 50 | | | 50 | | |
| 1-decene[1] | | 100 | | 100 | | | | |
| 1-dodecene[1] | | | 50 | | 50 | 50 | 50 | |
| 1-hexadecene[1] | | | | | 50 | | 50 | >95 |
| 1,5-hexadiene[1] | | | | | | | | <5 |

TABLE 1-continued

| | PAO1 | PAO2 | PAO3 | PAO4 | PAO5 | PAO6 | PAO7 | PAO8[5] |
|---|---|---|---|---|---|---|---|---|
| MW (Daltons)[2] | 2310 | 2530 | 2470 | 910 | 1600 | 2760 | 2500 | 2750[4] |
| DoP[3] | 21 | 18 | 18 | 6 | 8 | 20 | 13 | |

[1]Monomer compositions are reported as mol percent unless otherwise indicated
[2]Number average molecular weight ("Mn") as measured by GPC against polystyrene standards
[3]Degree of polymerization ("DoP") is calculated based on monomer composition and Mn:Mn/(ave monomer MW)
[4]Bimodal distribution
[5]Commercial material available from NuCera Solutions as Vybar 825

The effectiveness of the various polyolefins to thicken (i.e., viscosify) fluid carbon dioxide was determined by measuring the viscosity of the thickened carbon dioxide ratioed against neat carbon dioxide, that is the relative viscosity. A ViscoPro2100 moving piston viscometer unit was used to measure the viscosity of blends of each of the samples with carbon dioxide. The mixture of $CO_2$ and sample polymer was passed from the mixing setup to the viscometer.

Mixing of the $CO_2$/polymer mixtures was carried out in a rocking cell setup. The designated weight of sample polymer was charged into two separate rocking cells containing 20 mL carbon dioxide, each cell containing a stainless steel ball to aid agitation. The cells were charged to 2500 psi or 3500 psi and then submerged in a constant temperature water bath at 35° C. The cells were rocked in the water bath from a 45° angle to a −45° angle at a rocking frequency of 15 times/min and observed for solubility of the sample polymer in the supercritical carbon dioxide. Once a homogeneous composition was observed, the mixing of the $CO_2$ and polymer was determined to be complete.

The ViscoPro 2100 viscometer consists of a sensor in which a piston is moved from one end of the sensor to the other with the help of electromagnetic coils. The sensor also consists of a temperature probe. Once mixture of the sample polymer in $CO_2$ was achieved in the rocking cell, the valve connecting the rocking cell to the viscometer was opened, allowing the fluid to pass into the viscometer sensor. Temperature control was achieved in the lines connecting the viscometer and rocking cell setup with the help of heating bands. Real time readings of viscosity and temperature of the fluid in the sensor were provided. The results of the measurements and the pressures at which each measurement were taken are provided in Table 2.

TABLE 2

| | EX1 | EX2 | EX3 | EX4 | EX5 | EX6 | EX7 | EX8 |
|---|---|---|---|---|---|---|---|---|
| PAO1[1] | 1.5 | | | | | | | |
| PAO2[1] | | 1.5 | | | | | | |
| PAO3[1] | | | 1.5 | | | | | |
| PAO4[1] | | | | | | | 1.0 | |
| PAO5[1] | | | | | | 0.5 | | |
| PAO6[1] | | | | 0.7 | | | | |
| PAO7[1] | | | | | 0.3 | | | |
| PAO8[1] | | | | | | | | 0.5 |
| Pressure (psi) | 3500 | 3500 | 3500 | 3500 | 3500 | 3500 | 2500 | 3500 |
| Temperature (° C.) | 35 | 35 | 35 | 35 | 35 | 35 | 35 | 35 |
| Relative Viscosity[2] | 3.1 | 4.2 | 5.9 | 2.5 | 2.5 | 1.5 | 1.5 | 1.8 |

[1]Polymer treat rates are reported as weight percent in carbon dioxide
[2]Viscosity is reported relative to neat carbon dioxide under the same pressure and conditions Except in the Examples, or where otherwise explicitly indicated or required by context, all numerical quantities in this description specifying amounts of materials, reaction conditions, molecular weights, number of carbon atoms, and the like, are to be understood as modified by the word "about". As used herein, the term "about" means that a value of a given quantity is within +20% of the stated value. In other embodiments, the value is within +15% of the stated value. In other embodiments, the value is within +10% of the stated value. In other embodiments, the value is within +5% of the stated value. In other embodiments, the value is within +2.5% of the stated value. In other embodiments, the value is within +1% of the stated value. In other embodiments, the value is within a range of the explicitly-described value which would be understood by those of ordinary skill, based on the disclosures provided herein, to perform substantially similarly to compositions including the literal amounts described herein.

It is to be understood that the upper and lower amount, range, and ratio limits set forth herein may be independently combined, and that any amount within a disclosed range is contemplated to provide a minimum or maximum of a narrower range in alternative embodiments (with the proviso, of course, that the minimum amount of a range must be lower than the maximum amount of the same range). Similarly, the ranges and amounts for each element of the subject matter disclosed herein may be used together with ranges or amounts for any of the other elements.

While certain representative embodiments and details have been shown for the purpose of illustrating the subject matter disclosed herein, it will be apparent to those skilled in this art that various changes and modifications may be made therein without departing from the scope of the subject matter. In this regard, the scope of the invention is to be limited only by the following claims.

What is claimed:

1. A composition comprising fluid carbon dioxide and a polyolefin thickener, wherein the polyolefin thickener comprises a polymer of one or more olefin monomers having 8 or more carbon atoms, wherein at least 5 mol percent of the olefin monomers have 12 or more carbon atoms.

2. The composition of claim 1, wherein the olefin monomers are alpha-olefin monomers having 8 or more carbon atoms.

3. The composition of claim 1, wherein the polymer has a number average molecular weight of from 1,000 to 10,000 Daltons.

4. The composition of claim 1, wherein the polymer has a number average molecular weight of 1,400 to 4,500 Daltons.

5. The composition of claim 1, wherein the polyolefin thickener is present in an amount 0.01 to 5 weight percent, based on the total weight of the composition.

6. The composition of claim 1, wherein the polyolefin thickener is present in an amount 0.1 to 4 weight percent, based on the total weight of the composition.

7. The composition of claim 1, wherein the polyolefin thickener is present in an amount 0.25 to 2 weight percent, based on the total weight of the composition.

8. The composition of claim 1, wherein the olefin monomers comprise at least one of 1-octene, 1-decene, 1-dodecene, 1-tetradecene, or 1-hexadecene.

9. The composition of claim 1, wherein the olefin monomers comprise 5 to 60 mol percent 1-octene, 5 to 60 mol percent 1-dodecene, and 0 to 25 mol percent 1-decene.

10. The composition of claim 1, wherein the olefin monomers comprise less than 5 mol percent 1-decene.

11. The composition of claim 1, wherein the polyolefin is substantially free of 1-decene.

12. The composition of claim 1, wherein from 0.05 to 5 weight percent of the olefin monomers comprises at least one multifunctional monomer, based on the total weight of the polymer.

13. A method of improving oil recovery from subterranean formations, comprising injecting the formation with the composition of claim 1.

* * * * *